US008491047B1

(12) United States Patent
Moll

(10) Patent No.: US 8,491,047 B1
(45) Date of Patent: Jul. 23, 2013

(54) VEHICLE BODY STRUCTURE

(75) Inventor: Daniel Moll, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 13/356,100

(22) Filed: Jan. 23, 2012

(51) Int. Cl.
*B62D 25/04* (2006.01)

(52) U.S. Cl.
USPC .............................. 296/193.06; 296/203.03

(58) Field of Classification Search
USPC ............. 296/203.01, 203.03, 193.06, 187.12
See application file for complete search history.

(56) References Cited

U.S. PATENT DOCUMENTS

| | | | |
|---|---|---|---|
| 3,779,595 | A | 12/1973 | Suzuki et al. |
| 5,810,428 | A | 9/1998 | Maki |
| 6,328,376 | B2 | 12/2001 | Son |
| 6,474,726 | B1 | 11/2002 | Hanakawa et al. |
| 6,705,668 | B1 | 3/2004 | Makita et al. |
| 7,070,228 | B2 * | 7/2006 | Shimizu et al. .......... 296/187.01 |
| 7,121,615 | B2 * | 10/2006 | Hoshino ................... 296/203.03 |
| 7,445,269 | B2 | 11/2008 | Yustick et al. |
| 7,488,022 | B2 * | 2/2009 | Belwafa et al. ................. 296/29 |
| 7,510,234 | B2 | 3/2009 | Ameloot et al. |
| 7,815,247 | B2 * | 10/2010 | Obayashi ................. 296/193.06 |
| 7,976,098 | B2 * | 7/2011 | Nishimura et al. ...... 296/193.06 |
| 2002/0014302 | A1 * | 2/2002 | Fanucci et al. ................ 156/179 |

OTHER PUBLICATIONS

Nat'l Highway Traffic Safety Admin., Test Device Location and Application to The Roof, 49 CFR Ch. V (10-1-10 Edition).

* cited by examiner

*Primary Examiner* — Dennis Pedder
(74) *Attorney, Agent, or Firm* — Global IP Counselors, LLP

(57) ABSTRACT

An outer pillar panel is fixed to an inner pillar panel defining a vehicle pillar with a closed box cross section. A vertically extending cavity is defined between the inner and outer pillar panels. The outer pillar panel includes a first contact portion within the cavity. The roof side rail is rigidly fixed to the upper ends of the inner pillar panel and the outer pillar panel. The brace is fixed to the inner pillar panel within the cavity. The brace includes a second contact portion facing the first contact portion but is spaced apart therefrom by a predetermined gap with the inner and outer pillar panels in an undeformed state. The first contact portion contacts the second contact portion when an external force above a prescribed amount is applied to the vehicle body structure.

20 Claims, 12 Drawing Sheets

VEHICLE BODY STRUCTURE

BACKGROUND

1. Field of the Invention

The present invention generally relates to a vehicle body structure. More specifically, the present invention relates to a pillar assembly of the body structure.

2. Background Information

Vehicles are continuously being redesigned in order to improve fuel efficiency and to meet various related design challenges. One challenge involves maintaining the structural integrity of a vehicle frame structure without appreciably increasing the weight of the vehicle.

In view of the above, it will be apparent to those skilled in the art from this disclosure that there exists a need for maintaining the strength of a vehicle frame structure without increasing the weight of the vehicle. This invention addresses this need in the art as well as other needs, which will become apparent to those skilled in the art from this disclosure.

SUMMARY

One object of the present invention is to provide a vehicle pillar assembly with added rigidity without increasing overall material of the pillar.

In accordance with one aspect, a vehicle body structure includes an inner pillar panel, an outer pillar panel, a roof side rail and a brace. The inner pillar panel includes an upper end, a lower end, a vehicle interior side surface, a vehicle exterior side surface, and lateral edges. The outer pillar panel includes an upper end, a lower end, a vehicle interior side surface, a vehicle exterior side surface, and lateral edges. The lateral edges of the outer pillar panel are coupled to the lateral edges of the inner pillar panel to define a vehicle pillar with a closed box cross section in a transverse direction of the vehicle pillar and a vertically extending cavity between the inner and outer pillar panels. The vehicle interior side surface of the outer pillar panel includes a first contact portion facing the vehicle exterior side surface of the inner pillar panel. The roof side rail is rigidly fixed to the upper ends of the inner pillar panel and the outer pillar panel. The roof side rail extends in a direction transverse to the vehicle pillar. The brace is rigidly fixed to the vehicle exterior side surface of the inner pillar panel. The brace includes a second contact portion that faces the first contact portion of the outer pillar panel. The second contact portion of the brace is spaced apart from the first contact portion by a predetermined gap with the inner and outer pillar panels in an undeformed state. The inner pillar panel and the brace have a rigidity that is higher than the outer pillar panel and the predetermined gap has a dimension such that the first contact portion contacts the second contact portion in response to deformation of the outer pillar panel resulting from external force above a prescribed amount being applied to the vehicle body structure.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
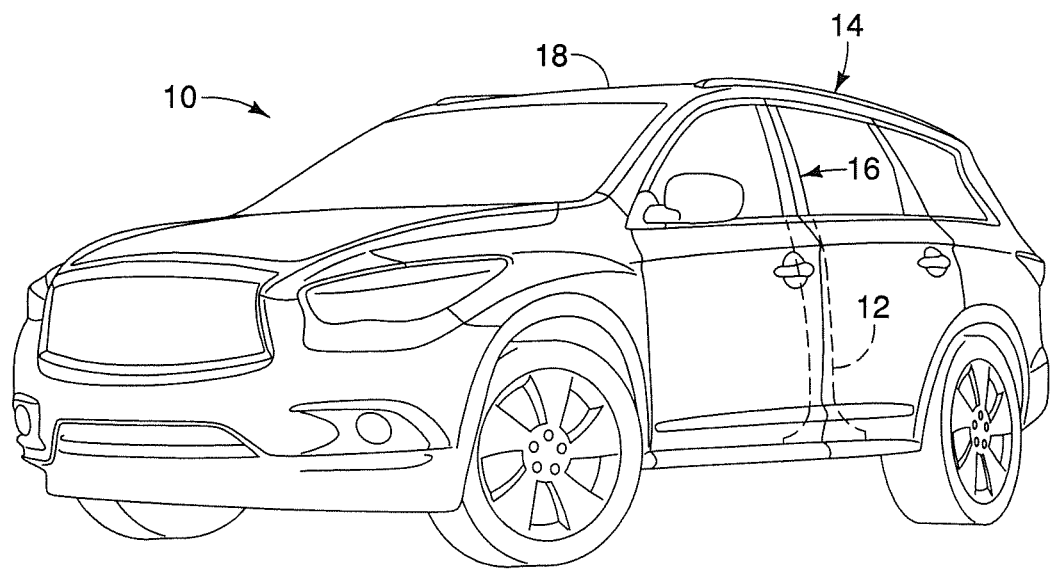
FIG. 1 is a perspective view of a vehicle with a vehicle structure that includes a pillar assembly in accordance with a first embodiment.

Referring initially to FIG. 1, a vehicle 10 is illustrated in accordance with a first embodiment. The vehicle 10 includes a pillar assembly 12 that is described in greater detail below.

Figure 2:
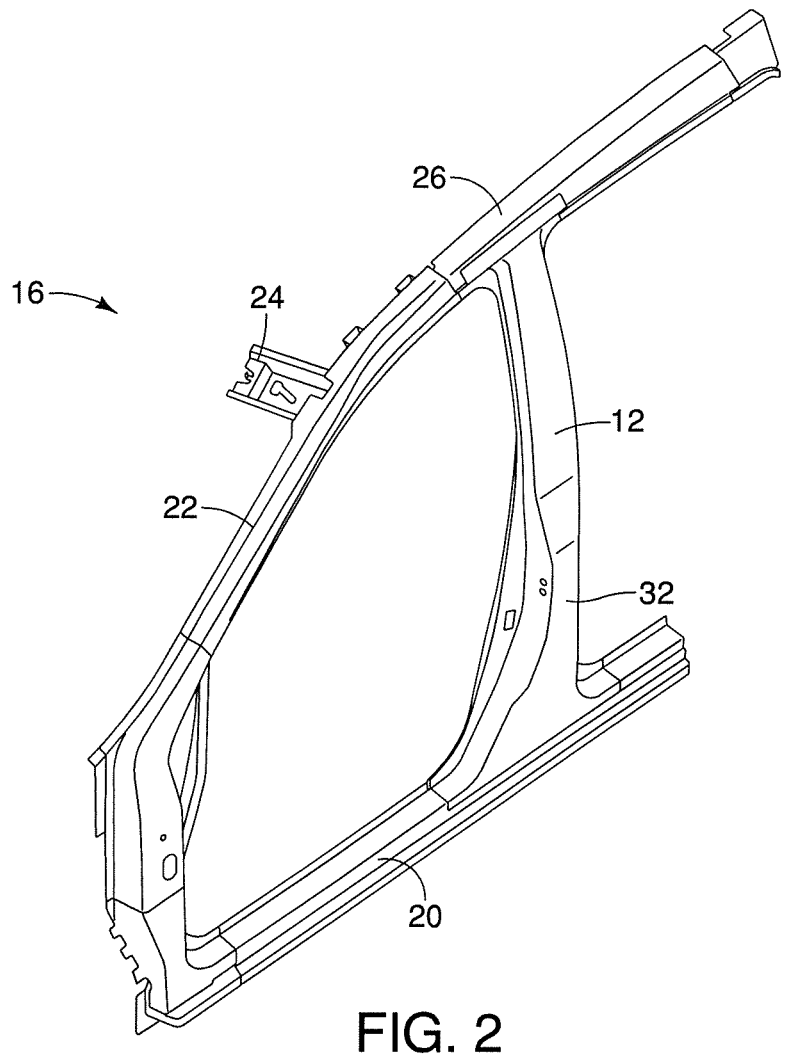
FIG. 2 is a perspective view of a vehicle structure and the pillar assembly in accordance with the first embodiment.
Figure 3:
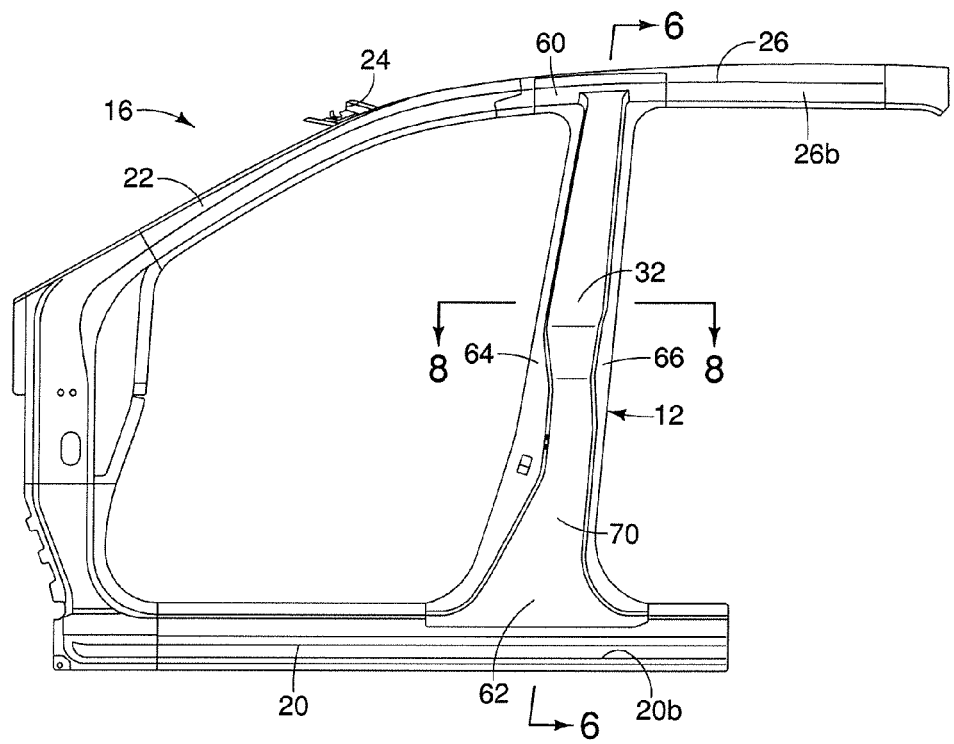
FIG. 3 is side view of the vehicle structure and the pillar assembly showing a vehicle exterior side surface in accordance with the first embodiment.
Figure 4:
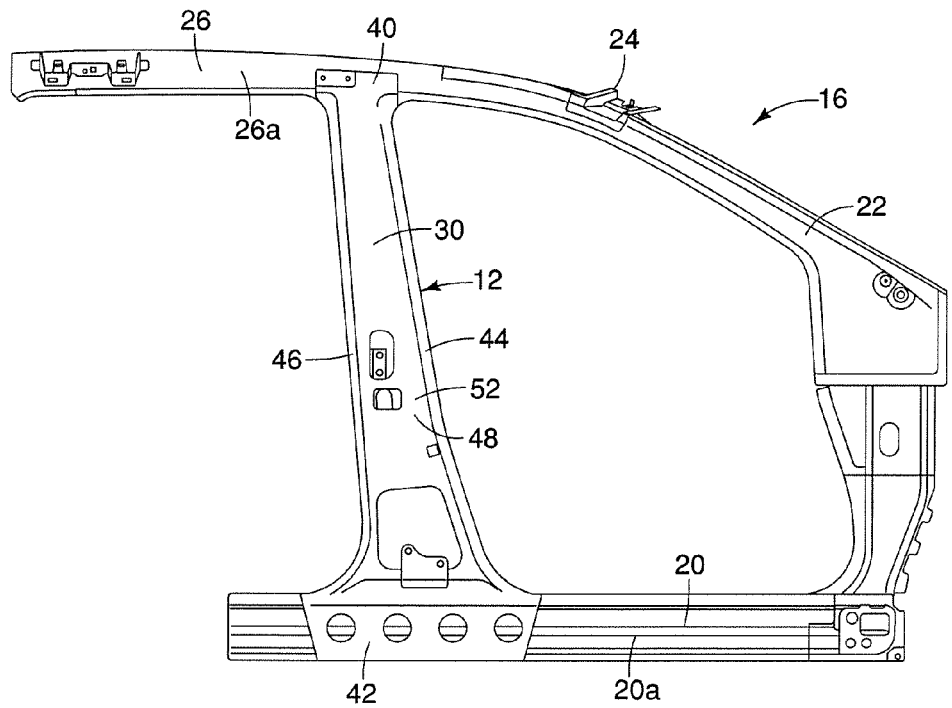
FIG. 4 is side view of the vehicle structure and the pillar assembly showing a vehicle interior side surface in accordance with the first embodiment.

As shown in FIGS. 2-4, the vehicle 10 also includes, among other things, a vehicle structure 14 that further includes a pair of sub-assemblies 16, with only one sub-assembly 16 being shown in FIG. 2. Since the sub-assemblies 16 are symmetrical (mirror images of one another), but otherwise identical, description of one sub-assembly 16 applies to both. Specifically, one of the sub-assemblies 16 forms a portion of the vehicle structure on the driver's side of the vehicle 10 and the other of the sub-assemblies 16 forms a portion of the vehicle structure on the passenger's side of the vehicle 10.

The vehicle structure 14 also includes a roof structure 18 (FIG. 1) having roof braces (not shown) as well as other conventional roof structural elements (only outer body panels are shown in FIG. 1).

As shown in FIGS. 2-4, the sub-assembly 16 basically includes a sill 20, an A-pillar 22, a front roof supporting bracket 24, a roof side rail 26 and the pillar assembly 12 (a B-pillar). The sub-assembly 16 can additionally include a C-pillar (not shown) and, depending upon the size and type of vehicle, the sub-assembly 16 can alternatively also include a D-pillar (not shown). More specifically, additional elements of the sub-assembly 16 are dependent upon the specific design of the vehicle 10. For example, if the vehicle is a four door SUV (sports utility vehicle) as shown in FIG. 1, the sub-assembly can include both a C-pillar and the D-pillar. However, if the vehicle 10 is, for example, a two door coupe, the sub-assembly 16 can additionally include the C-pillar, but not necessarily the D-pillar. The various elements of the sub-assembly 16 are all made of, for example, sheet metal. Alternatively, the sub-assembly 16 can be made of aluminum, aluminum alloys, or other metallic materials.

Figure 5:
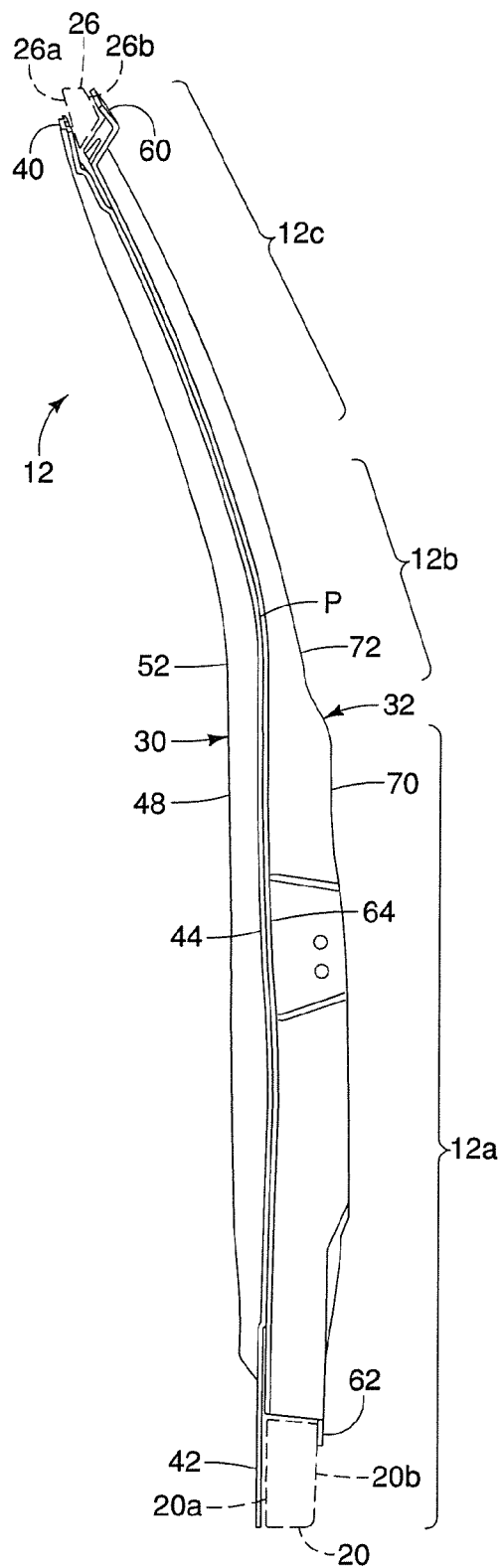
FIG. 5 is a front view of the pillar assembly shown removed from the vehicle structure in accordance with the first embodiment.

The sill 20 is basically a conventional hollow beam assembly that extends horizontally rearward from a lower end of the A-pillar 22 to proximate the rear of the vehicle 10. More specifically, the sill 20 extends in a direction transverse to the vehicle pillar 12. The sill 20 has an inner side 20a (FIGS. 4 and 5) and an outer side 20b (FIGS. 3 and 5). The A-pillar 22 is similarly a conventional hollow support assembly that is contoured such that the sill 20, the pillar assembly 12, a forward section of the roof rail 26 and the A-pillar 22 define an opening for a front door of the vehicle 10. The front roof supporting bracket 24 is a bracket fixed (e.g. welded) to the A-pillar and supports the roof structure 18. The front roof supporting bracket 24 also at least partially defines a windshield opening with the A-pillar 22 and portions of the roof structure 18. The roof side rail 26 is basically a conventional hollow beam assembly that extends horizontally rearward from an upper end of the A-pillar to the rear of the vehicle 10. The roof side rail 26 has an inner side 26a (FIG. 4) and an outer side 26b (FIG. 3). The roof side rail 26 extends in a direction transverse to the pillar assembly 12 (the vehicle pillar).

A description of the pillar assembly 12 is now provided with initial reference to FIGS. 2-7. The pillar assembly 12 is basically a B-pillar of the vehicle structure 16. The pillar assembly 12 extends between the sill 20 and the roof side rail 26. More specifically, a lower end of the pillar assembly 12 is fixed (e.g. welded) to the sill 20 and an upper end of the pillar assembly 12 is fixed (e.g. welded) to the roof side rail 26 in a manner described in greater detail below.

Figure 6:
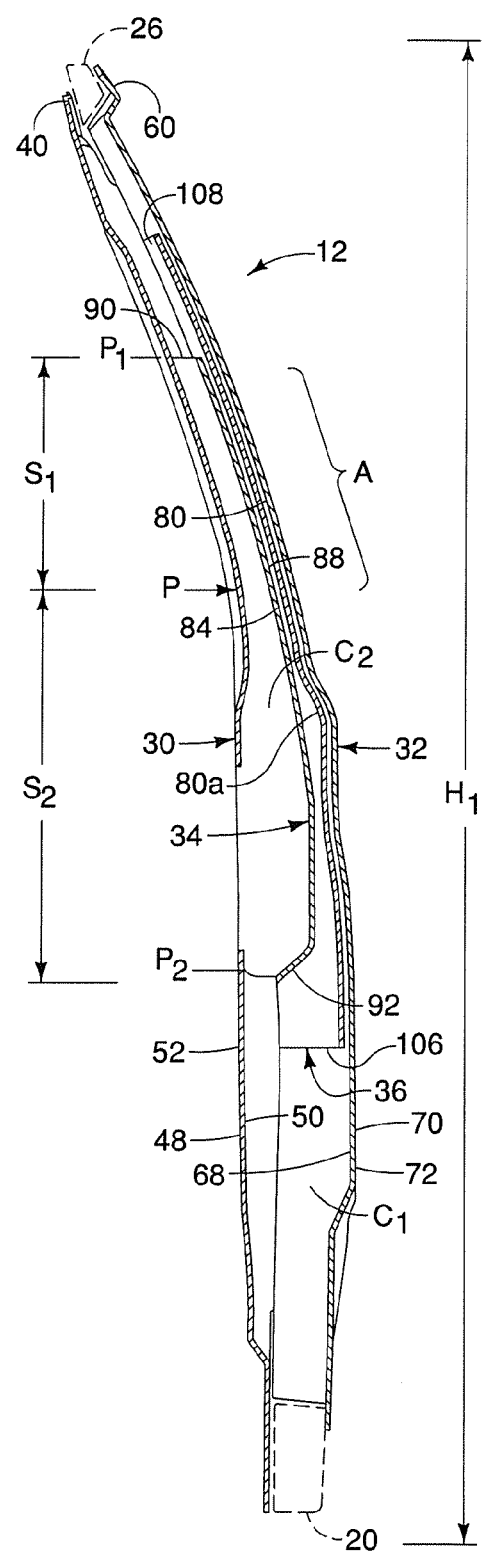
FIG. 6 is a cross-sectional view of the pillar assembly taken along the line 6-6 in FIG. 3, but shown removed from the vehicle structure in accordance with the first embodiment.
Figure 7:
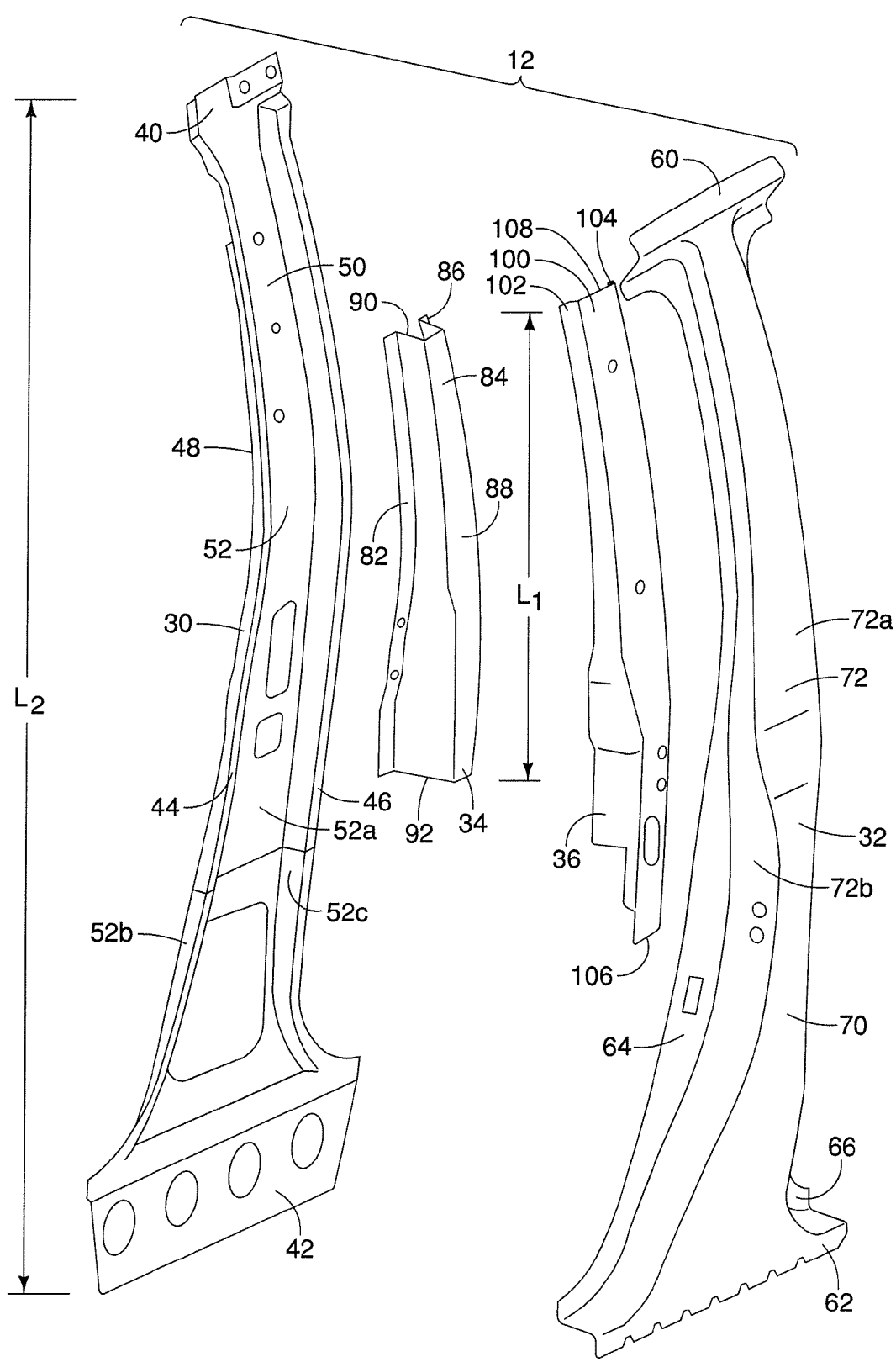
FIG. 7 is an exploded perspective view of the pillar assembly showing an inner pillar panel, a brace, a reinforcement panel and an outer pillar panel in accordance with the first embodiment.

As shown in FIGS. 5-7, the pillar assembly 12 basically includes an inner pillar panel 30, an outer pillar panel 32, a brace 34 (FIGS. 6 and 7), and a reinforcement panel 36 (FIGS. 6 and 7). As shown in FIG. 5, the pillar assembly 12 includes three sections, a lower section 12a, a mid-section 12b and an upper section 12c.

The inner pillar panel 30 includes an upper end 40, a lower end 42, a front flange 44, a rear flange 46, a vehicle interior side surface 48, a vehicle exterior side surface 50 and an offset section 52.

The lower section 12a has an approximately straight profile along a vertical direction. More specifically, the lower section 12a can have a slight curvature, but overall is generally vertically oriented. The mid-section 12b has an arcuate profile that is noticeable, compared to the lower section 12a. More specifically, the mid-section 12b is a curved section with a radius of curvature such that a central point P of the curved section is located outboard of the upper end 40 of the inner pillar panel 30 (see FIGS. 5 and 6). The upper section 12c has a generally straight profile, but can include a slight curvature. More specifically, the upper section 12c of the pillar assembly 12 is inclined with respect to a vertical direction, and is further inclined or angularly offset from the lower section 12a due to the curvature of the mid-section 12b. Although not shown in the drawings, the overall distance between the sill 20 on the driver's side and the sill 20 on the passenger's side of the vehicle 10 is greater than the overall distance between the roof side rail 26 on the driver's side and the roof side rail 26 on the passenger's side of the vehicle 10.

As shown in FIG. 4, the upper end 40 of the inner panel 30 includes a flange that is contoured to fit against the inner side 26a of the roof side rail 26. More specifically, the upper end 40 of the inner panel 30 is welded or otherwise rigidly and fixedly attached to the inner side 26a of the roof side rail 26.

As is also shown in FIG. 4, the lower end 42 of the inner panel 30 includes a flange that is contoured to fit against a portion of the inner side 20a of the sill 20. More specifically, the lower end 42 of the inner panel 30 is welded or otherwise rigidly and fixedly attached to the inner side 20a of the sill 20.

With reference to FIGS. 5 and 7, the front flange 44 of the inner panel 30 extends along one vertical edge of the inner panel 30 from proximate the upper end 40 to proximate the lower end 42. Similarly as indicated in FIG. 7, the rear flange 46 of the inner panel 30 extends along the other vertical edge of the inner panel 30 from proximate the upper end 40 to proximate the lower end 42. As is indicated in FIG. 5, the front flange 44 is contoured to conform to the overall shape of the pillar assembly 12. Specifically, the front flange 44 is shaped to define the lower section 12a, the mid-section 12b and the upper section 12c of the pillar assembly 12.

The front flange 44 and the rear flange 46 define lateral edges of the inner pillar panel 30. The rear flange 46 is similarly contoured, like the front flange 44, between the lower end 42 and the upper end 40 to define to the lower section 12a, the mid-section 12b and the upper section 12c of the pillar assembly 12. Thus, at any given point along a horizontal line extending between the front flange 44 and the rear flange 46, the front flange 44 and the rear flange 46 are preferably co-planar.

The offset section 52 is a contoured section of the inner panel 30 that defines a convex region of the inner panel 30 on the vehicle interior side surface 48 and a concave region of the inner panel 30 on the vehicle exterior side surface 50. The offset section 52 is located between the front flange 44 and the rear flange 46. The offset section 52 extends approximately parallel the each of the front flange 44 and the rear flange 46, but is spaced apart from the front flange 44 and the rear flange 46.

Figure 8:
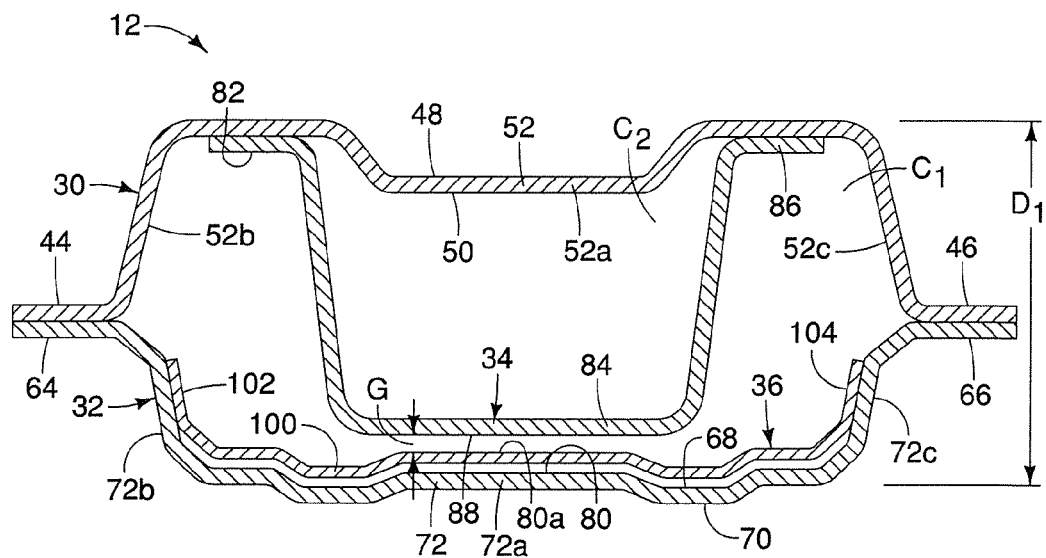
FIG. 8 is a cross-sectional view of the pillar assembly taken along the line 8-8 in FIG. 3, but shown removed from the vehicle structure in accordance with the first embodiment.
Figure 9:
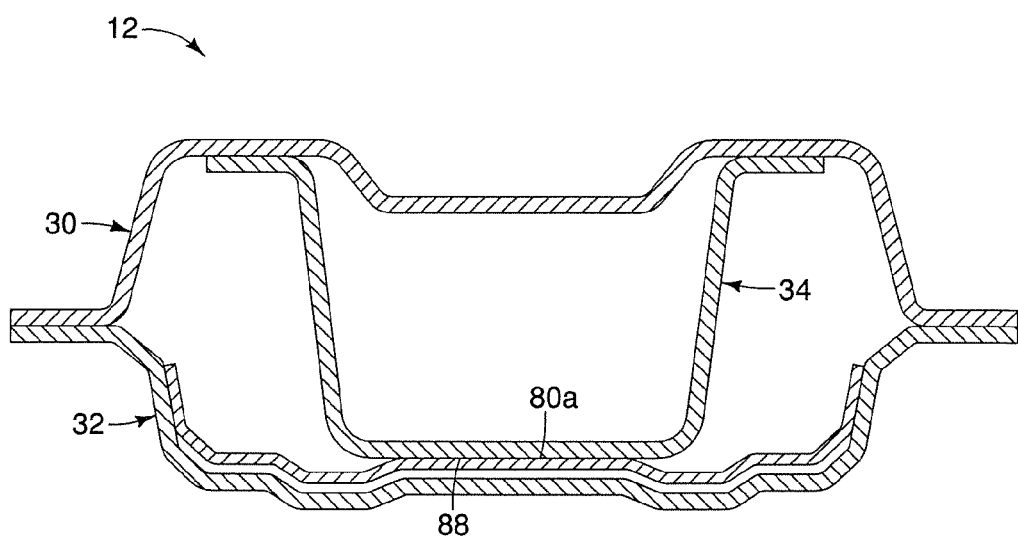
FIG. 9 is another cross-sectional view of the pillar assembly similar to FIG. 8, but showing the pillar assembly experiencing deformation in accordance with the first embodiment.

As shown in cross-section in FIG. 8, the offset section 52 includes a main section 52a, a front side 52b and a rear side 52c all located between the front flange 44 and the rear flange 46. The main section 52a, the front side 52b and the rear side 52c define a U-shape when viewed in cross-section, as shown in FIG. 8. Further, the front flange 44, the front side 52b, the main section 52a, the rear side 52c and the rear flange 46 together define a hat shape when viewed in cross-section, as shown in FIG. 8.

The outer pillar panel 32 includes an upper end 60, a lower end 62, a front flange 64, a rear flange 66, a vehicle interior side surface 68, a vehicle exterior side surface 70 and an offset section 72.

As shown in FIG. 3, the upper end 60 of the outer pillar panel 32 includes flange that is contoured to fit against the outer side 26b of the roof side rail 26. More specifically, the upper end 60 of the outer pillar panel 32 is welded or otherwise rigidly attached to the outer side 26b of the roof side rail 26.

As is also shown in FIG. 3, the lower end 62 of the outer pillar panel 32 includes a flange that is contoured to fit against a portion of the outer side 20a of the sill 20. More specifically, the lower end 62 of the outer pillar panel 32 is welded or otherwise rigidly attached to the outer side 20b of the sill 20.

The front flange 64 of the outer pillar panel 32 extends along one vertical edge of the outer pillar panel 32 from proximate the upper end 60 to proximate the lower end 62. Similarly, the rear flange 66 of the outer pillar panel 32 extends along the other vertical edge of the outer pillar panel 32 from proximate the upper end 60 to proximate the lower end 62. As is indicated in FIG. 5, the front flange 64 is contoured between the lower end 62 and upper end 60 to define the lower section 12a, the mid-section 12b and the upper section 12c of the pillar assembly 12. Like the front flange 64, the rear flange 66 is similarly contoured between the lower end 62 and the upper end 60 to define the lower section 12a, the mid-section 12b and the upper section 12c of the pillar assembly 12. At any given horizontal line extending between the front flange 64 and the rear flange 66, the front flange 64 and the rear flange 66 are co-planar. The front flange 64 and the rear flange 66 define lateral edges of the outer pillar panel 32.

The offset section 72 is a contoured section of the outer pillar panel 32 that defines a concave region of the outer pillar panel 32 on the vehicle interior side surface 68 and a convex region of the outer pillar panel 32 on the vehicle exterior side surface 70. The offset section 72 is located between the front flange 64 and the rear flange 66. The offset section 72 extends approximately parallel to each of the front flange 64 and the rear flange 66, but is spaced apart from the front flange 64 and the rear flange 66.

As shown in cross-section in FIG. 8, the offset section 72 includes a main section 72a, a front side 72b and a rear side 72c all located between the front flange 64 and the rear flange 66. The main section 72a, the front side 72b and the rear side 72c define a U-shape when viewed in cross-section, as shown in FIG. 8. Further, the front flange 64, the front side 72b, the main section 72a, the rear side 72c and the rear flange 66 together define a hat shape when viewed in cross-section, as shown in FIG. 8. However, the U-shape included in the outer pillar panel 32 is opposed to the U-shape included in the cross-section if the inner pillar panel 30.

The front flange 64 of the outer pillar panel 32 is fixed (e.g. welded) to the front flange 44 of the inner pillar panel 30. Similarly, the rear flange 66 of the outer pillar panel 32 is fixed (e.g. welded) to the rear flange 46 of the inner pillar panel 30. Thus, lateral edges (flanges 64 and 66) of the outer pillar panel 32 are coupled to lateral edges (flanges 44 and 46) of the inner pillar panel 30 at least partially defining the pillar assembly 12 with a closed box cross section in a transverse direction of the pillar assembly 12. Further, the U-shapes of the offset section 72 and the offset section 52 define a vertically extending cavity $C_1$ between the outer pillar panel 32 and the inner pillar panel 30, as indicated in FIGS. 6 and 8, with the vertically extending cavity $C_1$ including the closed box cross section.

Together, the inner pillar panel 30 and the outer pillar panel 32 define the B-pillar of the vehicle 10. However, it should be understood from the drawings and the description herein that the pillar defined by the inner and outer pillar panels 30 and 32 (with the brace 34 and/or the reinforcement panel 36) can also serve as other pillars in the vehicle 10, such as a C-pillar or a D-pillar as non-limiting examples.

Further, the vehicle interior side surface 68 of the outer pillar panel 32 includes a first contact portion 80 that faces the vehicle exterior side surface 50 of the inner pillar panel 30. The first contact portion 80 is described in greater detail below.

A description is now provided for the brace 34 with specific reference to FIGS. 6, 7 and 8. The brace 34 basically includes a first flange 82 (FIGS. 7 and 8), a central section 84 and a second flange 86 (FIG. 8). Both the first and second flanges 82 and 86 extend in a vertical direction and are fixedly attached to the vehicle exterior side surface 50 of the inner pillar panel 30. Both the first and second flanges 82 and 86 include an arcuate contour that conforms to the overall shapes of the lower section 12a, the mid-section 12b and the upper section 12c, insofar as those shapes are present in the adjacent portion of the offset section 52 of the inner pillar panel 50.

The first and second flanges 82 and 86 are rigidly and fixedly attached to the vehicle exterior side surface 50 of the offset section 52 of the inner pillar panel 30, for example, by welding. The brace 34 is therefore located within the vertically extending cavity $C_1$ of the pillar assembly 12, between the inner pillar panel 30 and the outer pillar panel 32. The first flange 82, the central section 84 and the second flange 86 together define a hat shape, when viewed in cross-section as shown in FIG. 8. Further, the inner pillar panel 30 and the brace 34 define a second closed box cross section in a transverse direction of the pillar assembly 12 within the vertically extending cavity $C_1$ defined by the inner and outer pillar panels 30 and 32. Further, the inner pillar panel 30 and the brace 34 also define a vertically extending cavity $C_2$ within the vertically extending cavity $C_1$.

The brace 34 also includes a second contact portion 88 that faces the vehicle interior side surface 68 of the outer pillar panel 32. A further description of the second contact portion 88 is proved below, after a description of the reinforcement panel 36.

As shown in FIG. 7, the brace 34 has an overall first length $L_1$ (measured vertically) and the inner pillar panel 30 has an overall second length $L_2$ that is greater than the first length $L_1$. An upper terminating end 90 of the brace 34 is positioned at a first point $P_1$ on the inner pillar panel 30 below and spaced apart from the upper end 40 of the inner pillar panel 30. Further, a lower terminating end 92 of the brace 34 is positioned at to a second point $P_2$ on the inner pillar panel 30 below the first point $P_1$, the second point being above and spaced apart from the lower end 42 of the inner pillar panel 30. Hence, the brace 34 extends along the inner pillar panel 30 from the first point $P_1$ above the mid-section 12b (the curved section) of the inner pillar panel 30, to the second point $P_2$ on the inner pillar panel 30 below the mid-section 12b (the curved section).

Further, the brace 34 can be considered to have two sections, a first section $S_1$ that extends upward from the central point P of the mid-section 12b (the curved section) and a second section $S_2$ that extends downward from the central point P of the mid-section 12b (the curved section), the second section $S_2$ of the brace 34 having a greater vertical length than the first section $S_1$ of the brace 34.

The first section $S_1$ of the brace and the second section $S_2$ of the brace 34 are angularly offset from one another about the central point P of the mid-section 12b (the curved section), such that the second contact portion 88 of the brace 34 also includes a curved section that extends approximately parallel to the curved section of the inner pillar panel 30. Further, the first contact portion 80 of the outer pillar panel 32 also includes a curved section that extends approximately parallel to the curved section of the inner pillar panel 30 and the second contact portion 88 of the brace 34 with the pillar assembly 12 in the undeformed state.

As description of the reinforcement panel 36 is now provided with specific reference to FIGS. 6, 7 and 8. The reinforcement panel 36 is basically a part of the outer pillar panel 32. Further, the reinforcement panel 36 is an optional member that is used in, for example, larger vehicles. In some vehicle designs it is possible to omit the reinforcement panel 36, as is demonstrated in later embodiments, described below.

The reinforcement panel 36 is rigidly and fixedly attached to the vehicle interior side surface 68 of the outer pillar panel 32 by, for example, welding. The reinforcement panel 36 extends vertically when included with the outer side pillar panel 32, as shown in FIG. 7. The reinforcement panel 36 basically includes a central section 100, a first side section 102 and a second side section 104. The central section 100 is disposed between the first and second side section 102 and 104. The central section 100, the first side section 102 and the second side section 104 all extend vertically and are contoured to fit within the offset section 72, as indicated in FIG. 8. The first and second side sections 102 and 104 are welded to the front side 72b and rear side 72c of the offset section 72 of the outer pillar panel 32. The central section 100 of the reinforcement panel 36 is preferably slightly spaced apart from the adjacent surface (the first contact portion 80) of the main section 72a of the offset section 72 of the outer pillar panel 32.

As shown in FIGS. 6 and 7, the reinforcement panel 36 has a lower end 106 terminating at a point above the lower end 62 of the outer pillar panel 32 and an upper end 108 terminating at a point below the upper end 60 of the outer pillar panel 32. Further, the lower end 106 of the reinforcement panel 36 terminates at a point below the lower terminating end 92 of the brace 34. Also, the upper end 108 of the reinforcement panel 36 terminates at a point above the upper terminating end 90 of the brace 34. Hence, the reinforcement panel 36 as an overall vertical length that is greater than the overall vertical length of the brace 34.

The reinforcement panel 36 also includes a first contact portion 80a defined on a vehicle interior side of central section 100 of the reinforcement panel 36. The first contact portion 80a faces the brace 34, specifically the second contact portion 88 of the brace 34.

The description below of a first contact portion (80 or 80a) applies equally to both the first contact portion 80a of the reinforcement panel 36 and the first contact portion 80 of the outer pillar panel 32. More specifically, for pillar assembly configurations that do not include the reinforcement panel 36, the first contact portion 80 of the outer pillar panel 32 serves as the first contact portion of the pillar assembly 12. However, for pillar assembly configurations that include the reinforcement panel 36, the first contact portion 80a of the reinforcement panel 36 serves as the first contact portion of the pillar assembly 12.

The second contact portion 88 of the brace 34 is spaced apart from the first contact portion 80 (80a) by a predetermined gap G with the inner and outer pillar panels 30 and 32 in an undeformed state. The inner pillar panel 30 and the brace 34, welded to one another, have a rigidity that is higher than the outer pillar panel 32. The predetermined gap G has a dimension such that the first contact portion 80 (80a) contacts the second contact portion 88 in response to deformation of the outer pillar panel 32 resulting from external force (a crushing force) above a prescribed amount being applied to the vehicle structure 14, typically to the roof side rail 26 and transmitted to both the inner and outer pillar panels 30 and 32. The brace 34 is positioned such that surface sections or at least a portion of the first contact portion 80 (80a) contacts the second contact portion 88 defining a vertical friction area A (FIG. 6) that produces resistance to movement of the outer pillar panel 32 relative to the brace 34 from the external force.

Hence, the first and second contact portions 80 (80a) and 88 are arranged to frictionally contact each other such that the frictional contact between the first and second contact portions 80 (80a) and 88 produces resistance to movement of the outer pillar panel 32 relative to the brace 34 (and the inner pillar panel 30) from the external force. As shown in FIG. 6, the first and second contact portions 80 (80a) and 88 are located substantially above respective mid-points of the outer and inner pillar panels 30 and 32.

As shown in FIG. 6, the pillar assembly 12 has an overall height $H_1$ that can be, for example, between 900 mm and 1700 mm. As shown in FIG. 8, the pillar assembly 12 has a depth $D_1$ (measured in a horizontal direction, perpendicular to the length of the vehicle 10). The depth $D_1$ of the pillar assembly 12 is measured between the vehicle interior side surface 48 of the inner pillar panel 30 and the vehicle exterior side surface 70 of the outer pillar panel 30 along the first and second contact portions 80 (80a) and 88. The depth $D_1$ can typically be between 35 mm and 130 mm. In an undeformed state shown in FIG. 8, the second contact portion 88 is spaced apart from the first contact portion 80 (80a) by a distance (the predetermined gap G) of about two millimeters. Hence, the predetermined gap G can be between approximately 1% to 6% of the depth $D_1$, and between approximately 0.1% to 0.2% of the height $H_1$ of the pillar assembly 12.

As is shown in FIGS. 5 and 6, the offset section 52 of the inner pillar panel 30 extends vertically along an area of the pillar assembly 12 corresponding to the first and second contact portions 80 (80a) and 88. Further, the offset section 52 of the inner pillar panel 30 can be dimensioned to extend vertically above and below the area of the pillar assembly 12 corresponding to the first and second contact portions 80 (80a) and 88.

The brace 34 of the pillar assembly 12 was designed for many purposes relating to strength of the pillar assembly 12 and overall strength of the vehicle structure 14. For example, one aspect of the pillar assembly 12 and the vehicle structure 14 includes providing the pillar assembly 12 and the vehicle structure 14 with the strength to withstand a roof crush force that is in compliance with recent changes to United States vehicle safety standards. The brace 34 is rigidly attached only to the inner pillar panel 30 and is free from contact with the outer pillar panel 32 in an undeformed state. In the first embodiment, the brace 34 forms a closed box section with the inner pillar panel 30, with an exterior side surface of the brace 34 being spaced apart from the outer pillar panel 32 (including the reinforcement panel 36).

Upon the application of force downward to the vehicle structure 14, such as the side roof rail 26, the inner pillar panel 30 resists buckling due to the reinforcement provided by the brace 34. When the outer pillar panel 32 begins to deform, the outer pillar panel 32 moves inward and makes contact at the first contact portion 80 (80a) with the second contact portion 88 of the brace 34. Since the brace 34 is not rigidly attached to the outer pillar panel 32, the outer pillar panel 32 can move relative to the brace 34, causing friction between the outer pillar panel 32 and the brace 34, which adds further resistance to collapsing of the closed box section between the inner pillar panel 30 and the outer pillar panel 32, thus resisting crushing of the pillar assembly 12.

49 C.F.R. §571.216a sets forth test criteria for roof crush resistance. The test criteria includes the application of force to an area of the vehicle roof proximate the roof rail and B-pillar, as shown, for example, in FIG. 10. A test device 120 shown in FIG. 10 having a force applying member 122 that is positioned above the vehicle 10. More specifically, the force applying member 122 is positioned to apply force to the roof side rail 26 and consequently to the pillar assembly 12. The force applying member 122 is angularly offset from horizontal by an angle θ that is preferably equal to 25 degrees. The test device is configured to apply a downward force that simulates rollover of a vehicle.

As the force applying member 122 is moved linearly downward against the vehicle structure 14, the displacement (movement) of the force applying member 122 is measured as is the reactionary force applied to the force applying member 122 by the vehicle structure 14. The reactionary force applied by the vehicle structure 14 is influenced by the configuration of the pillar assembly 12. However, the reactionary force applied by the vehicle structure 14 is influenced by other sections of the vehicle structure 14.

FIGS. 11-14 schematically show the pillar assembly 12 in isolation, with other portions of the vehicle structure 14 removed, in order to demonstrate the overall deformation of the pillar assembly 12.

Figure 11:
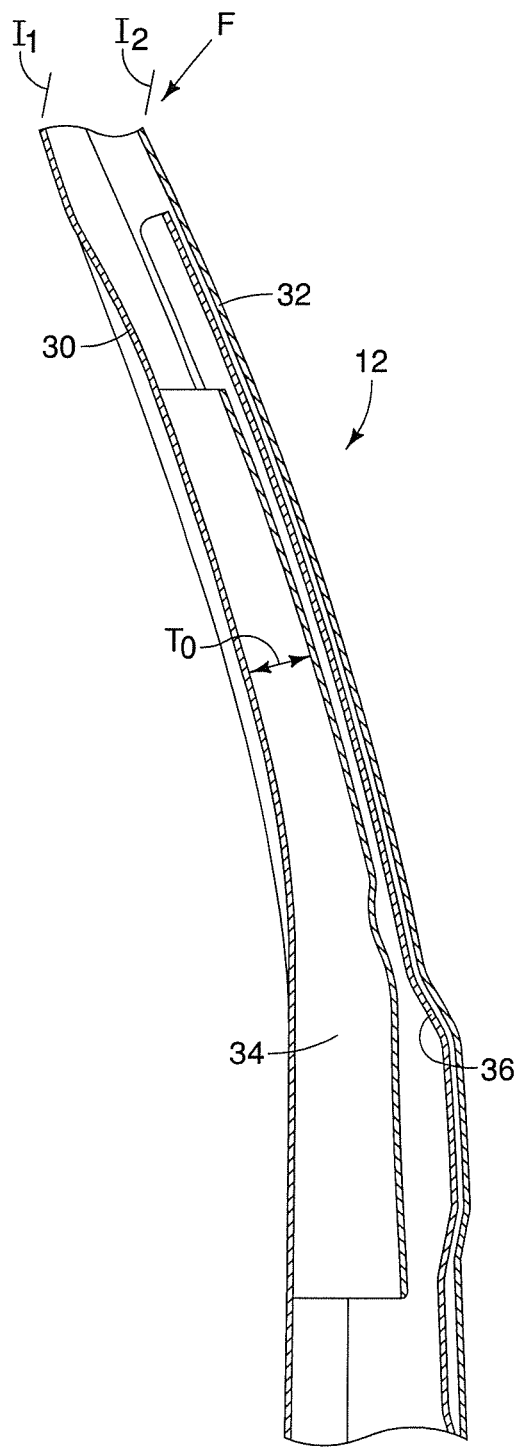
FIG. 11 is a first schematic cross-sectional view of the pillar assembly in an undeformed state in accordance with the first embodiment.

FIG. 11 schematically shows the pillar assembly 12 in an undeformed state prior to commencement of the test performed by the test device 120. The arrow F in FIGS. 11-14 represents the force applied by the force applying member 122, and hence also represents a reaction force applied by the vehicle structure 14 and the pillar assembly 12 against the force applying member 122. The force applying member 122 also includes a force measuring device that measures the reaction force applied by the vehicle structure 14, including the pillar assembly 12, against the force applying member 122.

In FIG. 11, the outer pillar panel 32 and the reinforcement panel 36 are spaced apart from the brace 34. More specifically, the first contact portion 80 (80a) is spaced apart from the second contact portion 88. Further, the outer pillar panel 32 is spaced apart from an adjacent surface of the reinforcement panel 36. Initial location of upper ends of the inner and outer panels 30 and 32 are marked with position indicators $I_1$ and $I_2$ in FIGS. 11-14 to show displacement of the upper end of the pillar assembly 12 during the test.

Figure 12:
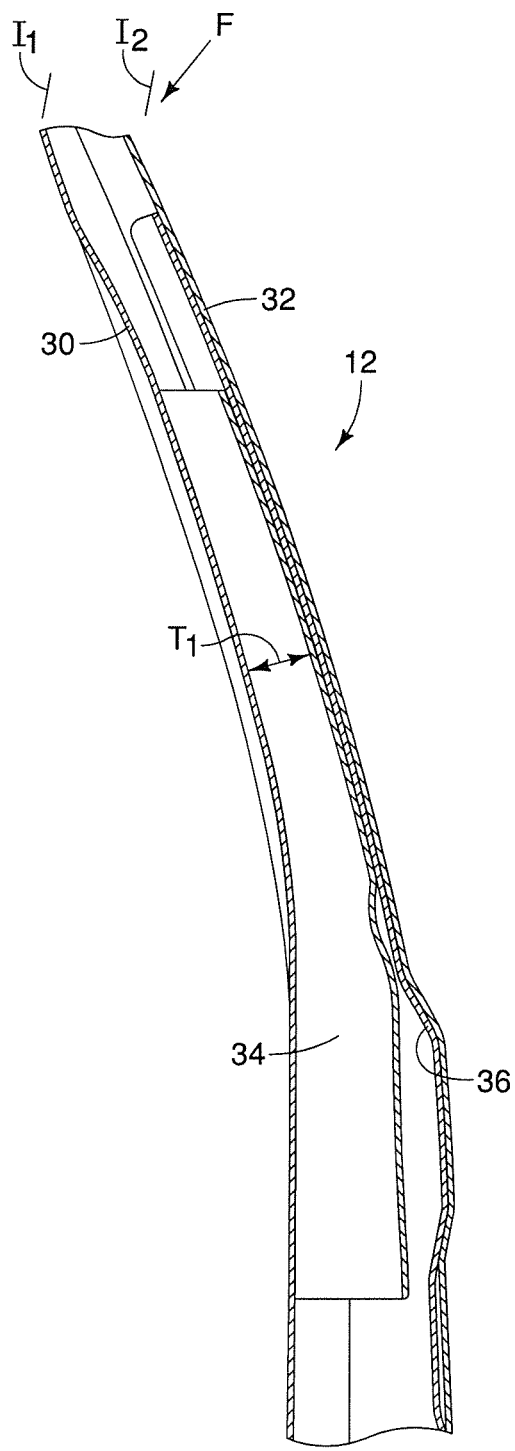
FIG. 12 is a second schematic cross-sectional view of the pillar assembly in a first stage of deformation state in accordance with the first embodiment.

FIG. 12 schematically shows the pillar assembly 12 in a slightly deformed state after commencement of the test performed by the test device 120, where the force applying member 122 has moved 20 mm downward (at the angle θ) against the vehicle body structure 14 and the pillar assembly 12. The position indicators $I_1$ and $I_2$ show that the upper end of the inner pillar panel 30 does not appear to have deformed in a noticeable amount. However, the upper end of the outer pillar panel 32 has undergone some deformation. The reactive force F applied by the vehicle structure 14 (and the pillar assembly 12) to the force applying member 122 at 20 mm is depicted in the graph in FIG. 15. Further, as can be ascertained in FIG. 12, the first contact portion 80 (80a) now contacts the second contact portion 88. Further, the outer pillar panel 32 is no longer spaced apart from an adjacent surface of the reinforcement panel 36. Clearly, the outer pillar panel 32 has undergone some deformation and the first and second contact portions 80 (80a) and 88 are in friction contact with one another.

Figure 13:
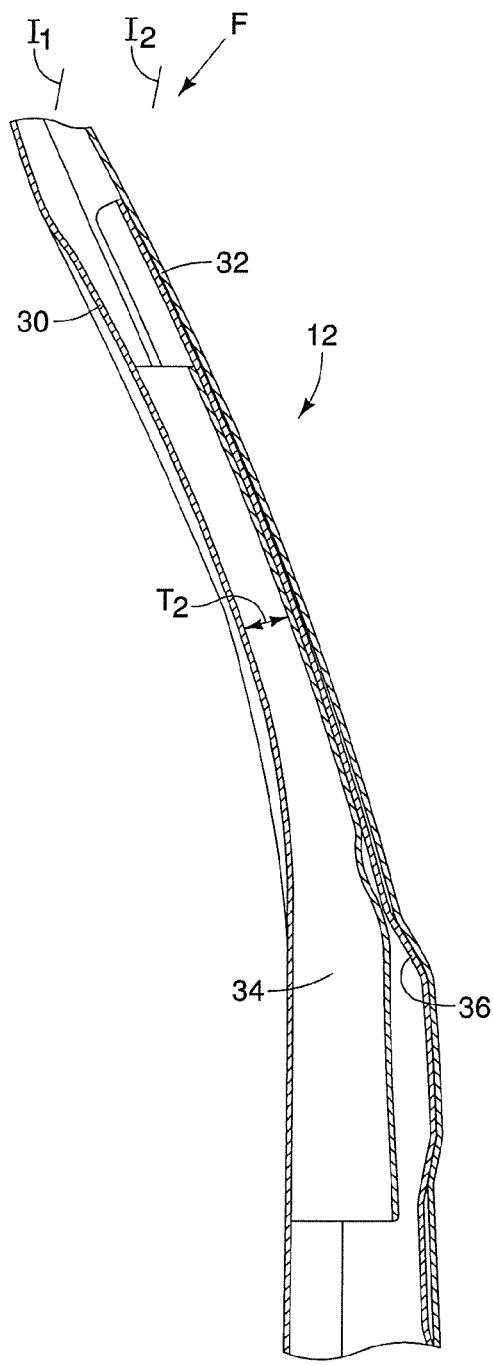
FIG. 13 is a third schematic cross-sectional view of the pillar assembly in a second stage of deformation state in accordance with the first embodiment.

FIG. 13 schematically shows the pillar assembly 12 in a further deformed state where the force applying member 122 has moved 40 mm downward (at the angle θ) against the vehicle body structure 14 and the pillar assembly 12. The position indicators $I_1$ and $I_2$ show that the upper end of the inner pillar panel 30 and the upper end of the outer pillar panel 32 have undergone displacement indicating some overall deformation of the pillar assembly 12. At this point in time, the outer pillar panel 32 is under tension, wrapping around the brace 34, with frictional contact between the first and second contact portions 80 (80a) and 88, providing resistance to overall deformation of the pillar assembly 12. The reactive force applied by the vehicle structure 14 (including the pillar assembly 12) to the force applying member 122 at 40 mm is also depicted in the graph in FIG. 15.

Figure 14:
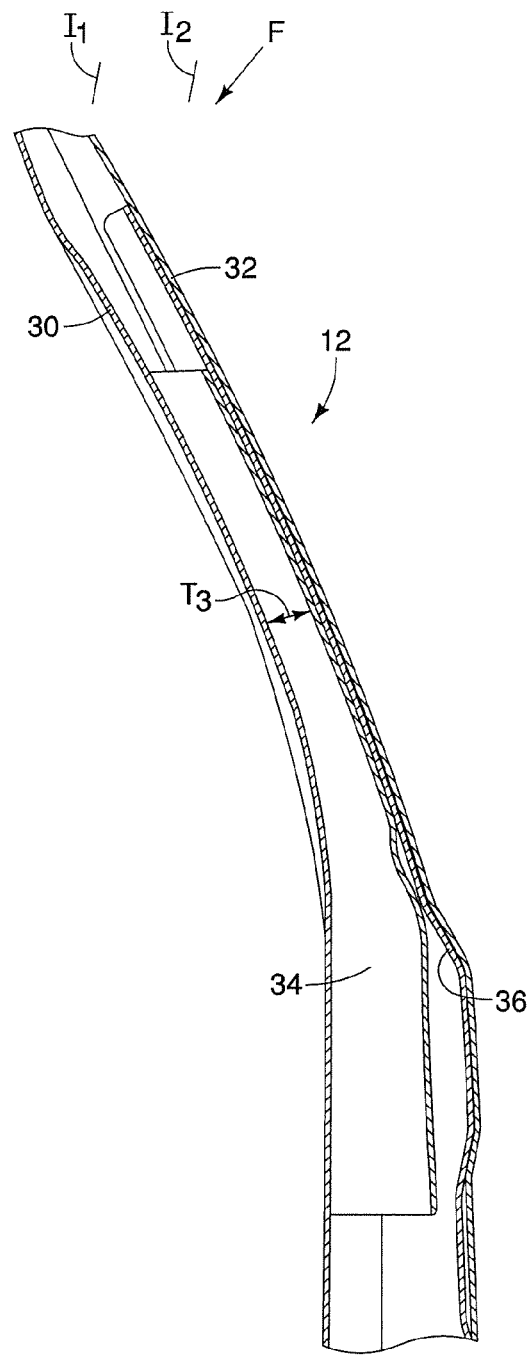
FIG. 14 is a fourth schematic cross-sectional view of the pillar assembly in a third stage of deformation state in accordance with the first embodiment.

FIG. 14 schematically shows the pillar assembly 12 in a further deformed state where the force applying member 122 has moved 60 mm downward (at the angle θ) against the vehicle body structure 14. The position indicators $I_1$ and $I_2$ show that the upper end of the inner pillar panel 30 and the upper end of the outer pillar panel 32 have undergone noticeable displacement providing a further indication of deformation of the pillar assembly 12. Even at 60 mm of downward displacement, the pillar assembly 12 provides a significant reactive force F demonstrating that it has not yet failed and can sustain further movement of the force applying member 122 without experiencing critical failure.

As shown in FIG. 11, the brace 34 has an initial thickness $T_0$ in an undeformed state. In the state shown in FIG. 12 with a small amount of deformation of the pillar assembly 12, the brace 34 has a thickness $T_1$ that is essentially equal to $T_0$ because the deformation of the pillar assembly 12 is generally confined to the outer pillar panel 32.

In the state shown in FIG. 13 with further overall deformation of the pillar assembly 12, the brace 34 has a thickness $T_2$ that is essentially only slightly less than $T_1$ because the deformation of the pillar assembly 12 is still generally confined to the outer pillar panel 32, with the inner pillar panel 30 beginning to show signs of deformation. Finally, in the state shown in FIG. 14 with still further deformation of the pillar assembly 12, the brace 34 has a thickness $T_3$ that is noticeably less than $T_0$ and $T_1$ because the entire pillar assembly 12 is now showing signs of deformation.

Figure 10:
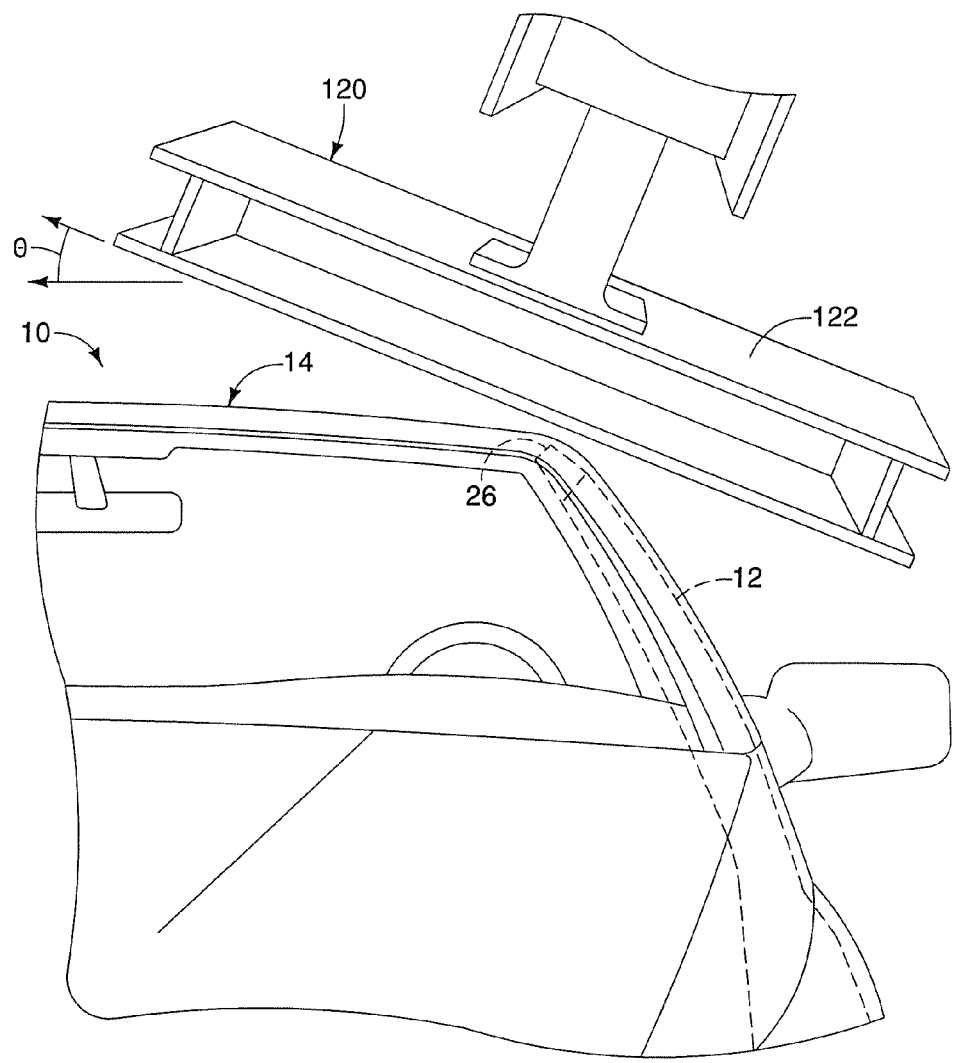
FIG. 10 is a front view of the vehicle depicted in FIG. 1, also showing a test device that simulates compressive forces applied to a roof of a vehicle during vehicle rollover incidents.
Figure 15:
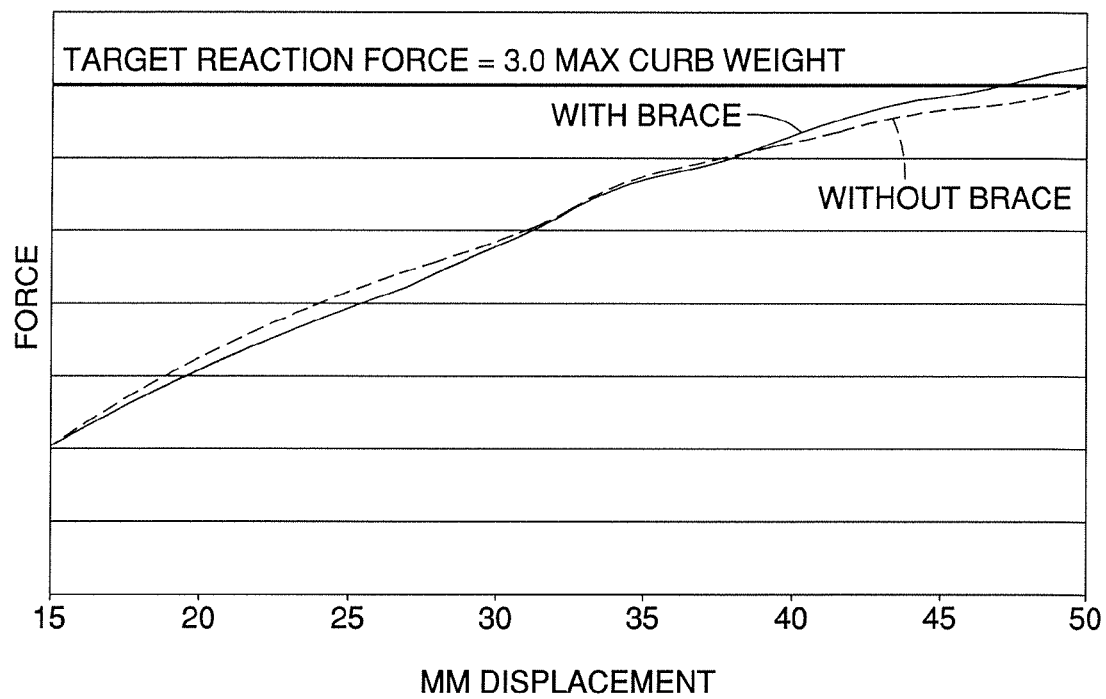
FIG. 15 is a graph showing results of a test conducted by the test device depicted in FIG. 10, the graph showing displacement in millimeters (mm) of movement of the test device against the vehicle structure at the location of the pillar assembly, the graph further showing measured reaction force from the vehicle structure, including pillar the assembly, with the deformation of the pillar assembly shown in FIGS. 11-14 being indicated on the graph, in accordance with the first embodiment.

The graph in FIG. 15 shows corresponding test results from the experiment using the test device 120 depicted in FIG. 10. The depiction of the pillar assembly 12 in FIGS. 12 and 13 corresponds to the deformation at 20 mm and 40 mm, respectively, shown in the graph in FIG. 15. The solid data line shown in the graph of FIG. 15 labeled "With Brace", corresponds to the measured reactive force F from the vehicle structure 14 including the pillar assembly 12 during the test. The dashed line labeled "Without Brace" represents test results from a control study of a pillar assembly (not shown) that is substantially identical to the pillar assembly 12, but with the brace 34 completely omitted. In other words, the dashed line "Without Brace" in FIG. 15 represents the pillar assembly without the brace 34.

As is indicated in the graph in FIG. 15, a target reaction force, which in accordance with the test device 120 depicted in FIG. 10, should be three times the curb weight of the vehicle being tested. As can be observed from the graph in FIG. 15, the pillar assembly "With Brace" achieves the target reaction force before the pillar assembly "Without Brace." Hence, the pillar assembly 12 helps to meet the requirements of the tests described above by maintaining stiffness of the pillar structure 12 long enough for the vehicle structure 14 to achieve the target reaction force before the force applied to the vehicle structure 14 with the test device 120 causes the vehicle structure 14 to plasticize (plastically deform), thus losing stiffness. The pillar assembly "Without Brace" fails to achieve the target reaction force before such a plasticizing event.

As the graph clearly shows, at levels of displacement of the force applying member 122 greater than 40 mm, the vehicle body structure 14 having the pillar assembly 12 with the brace 34 provides a more favorable reactionary force response.

Second Embodiment

Figure 16:
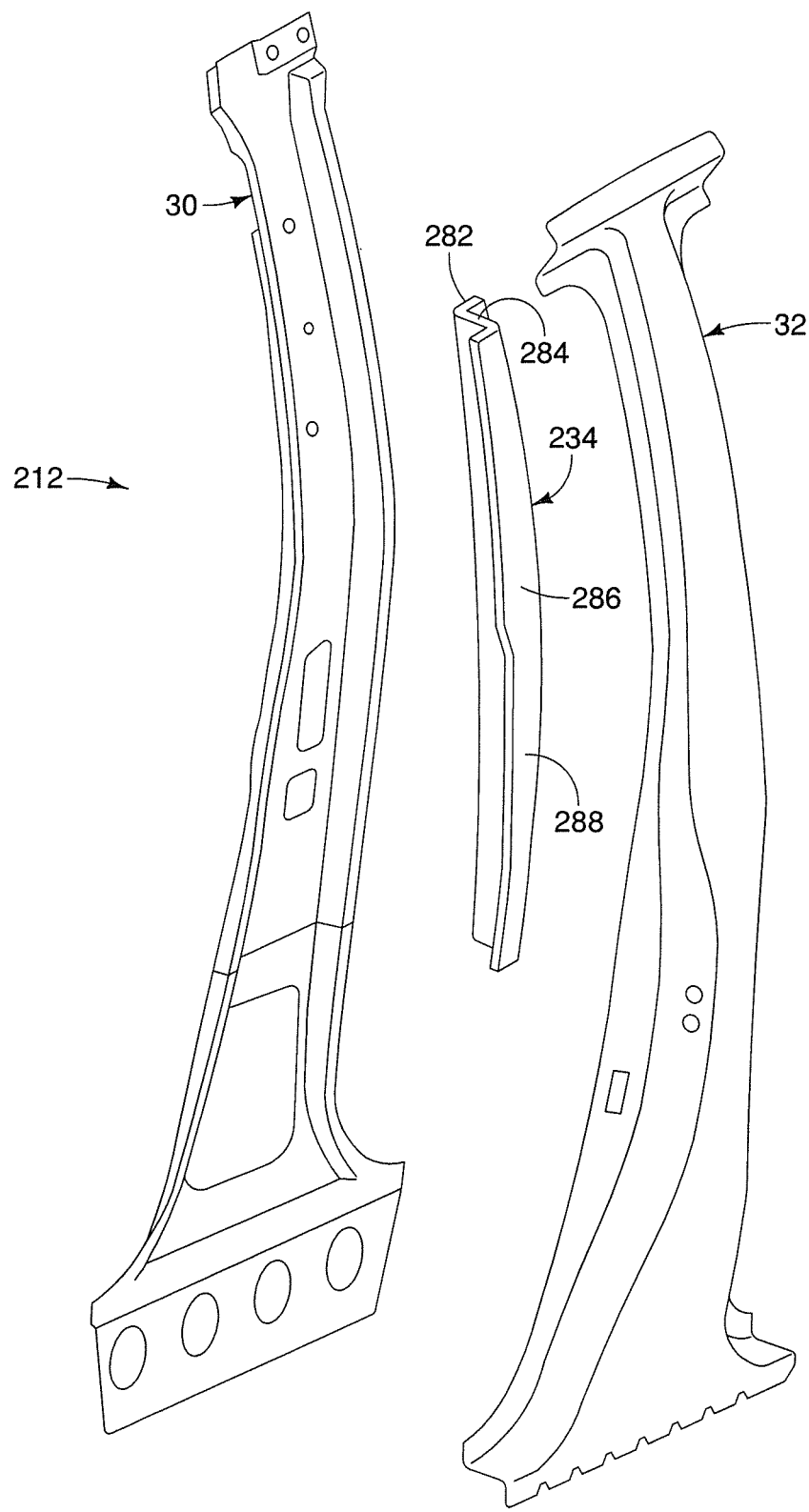
FIG. 16 is an exploded perspective view of a pillar assembly showing an inner pillar panel, a brace and an outer pillar panel in accordance with a second embodiment.
Figure 17:
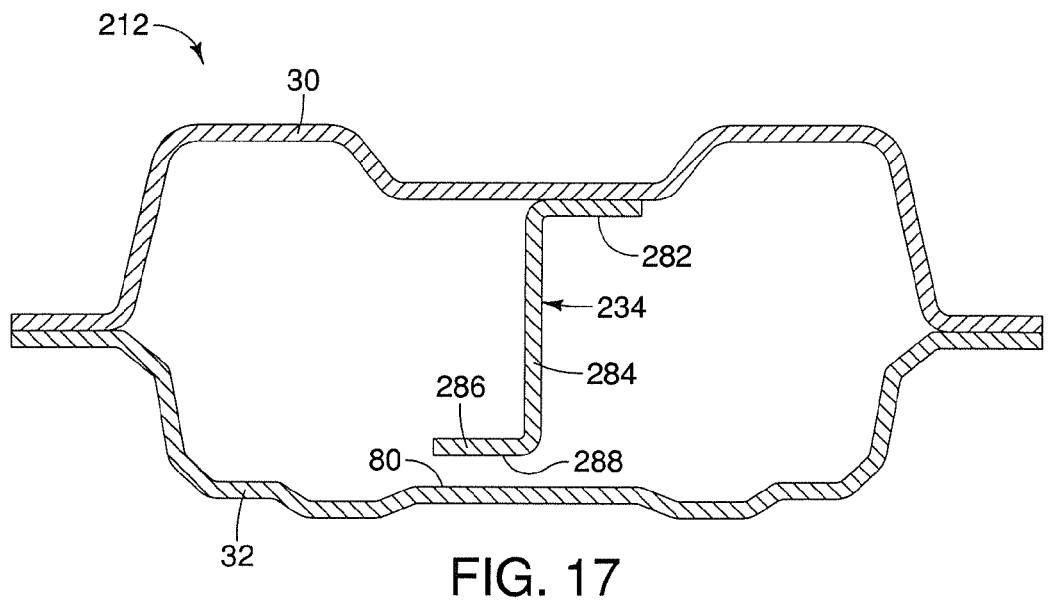
FIG. 17 is a cross-sectional view of the pillar assembly shown in FIG. 15, in accordance with the second embodiment.

Referring now to FIGS. 16 and 17, a pillar assembly 212 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The pillar assembly 212 of the second embodiment includes the inner pillar panel 30 and the outer pillar panel 32 as described above with respect to the pillar assembly 12 of the first embodiment. However, in the second embodiment, the reinforcement panel 36 is omitted and the brace 34 is replaced with a brace 234, as shown in FIG. 16. Preferably, the brace 234 has the same overall vertical length as the brace 34 of the first embodiment. However, the brace 234 has a differing profile, in particular, when viewed in cross-section, as in FIG. 16.

More specifically, the brace 234 includes a first flange 282, a central section 284 and a second flange 286 defining a transverse Z-shaped cross section, as shown in FIG. 17. The first flange 282 is rigidly and fixedly attached to the vehicle exterior side surface of the inner pillar panel 30. The central section 284 extends away from the inner pillar panel 30 toward the outer pillar panel 32. The second flange 286 defines a second contact portion 288. The second contact portion 288 has the same relationship with the first contact portion 80 as the second contact portion 88 described above with respect to the first embodiment.

Third Embodiment

Figure 18:
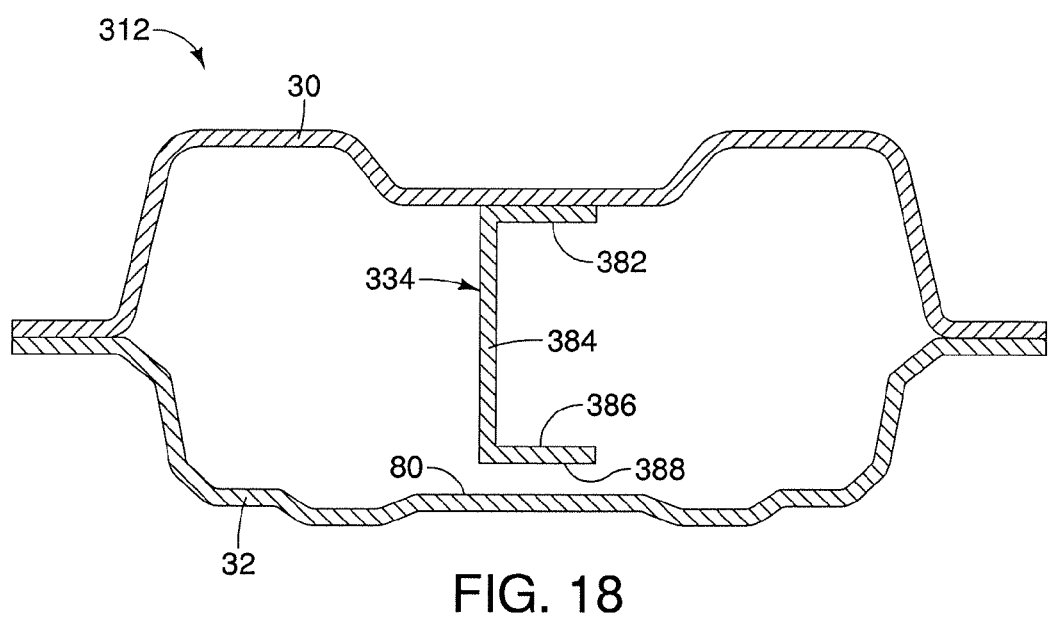
FIG. 18 is a cross-sectional view of a pillar assembly in accordance with a third embodiment.

Referring now to FIG. 18, a pillar assembly 312 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The pillar assembly 312 of the third embodiment includes the inner pillar panel 30 and the outer pillar panel 32 as described above with respect to the pillar assembly 12 of the first embodiment. However, in the third embodiment, the reinforcement panel 36 is omitted and the brace 34 is replaced with a brace 334, as shown in FIG. 18. Preferably, the brace 334 has the same overall vertical length as the brace 34 of the first embodiment. However, the brace 334 has a differing profile, in particular, when viewed in cross-section, as in FIG. 18.

More specifically, the brace 334 includes a first flange 382, a central section 384 and a second flange 386 defining a transverse C-shaped cross section, as shown in FIG. 18. The first flange 382 is rigidly and fixedly attached to the vehicle exterior side surface of the inner pillar panel 30. The central section 384 extends away from the inner pillar panel 30 toward the outer pillar panel 32. The second flange 386 defines a second contact portion 388. The second contact portion 388 has the same relationship with the first contact portion 80 as the second contact portion 88 described above with respect to the first embodiment.

Fourth Embodiment

Figure 19:
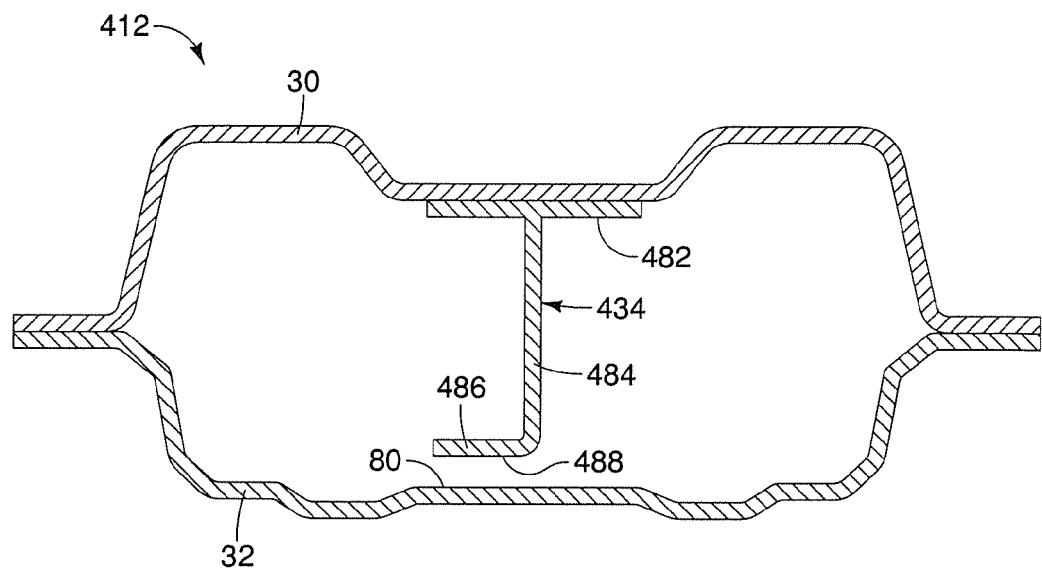
FIG. 19 is a cross-sectional view of a pillar assembly in accordance with a fourth embodiment.

Referring now to FIG. 19, a pillar assembly 412 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The pillar assembly 412 of the fourth embodiment includes the inner pillar panel 30 and the outer pillar panel 32 as described above with respect to the pillar assembly 12 of the first embodiment. However, in the fourth embodiment, the reinforcement panel 36 is omitted and the brace 34 is replaced with a brace 434, as shown in FIG. 19. Preferably, the brace 434 has the same overall vertical length as the brace 34 of the first embodiment. However, the brace 434 has a differing profile, in particular, when viewed in cross-section, as in FIG. 18.

More specifically, the brace 434 includes a first flange 482, a central section 484 and a second flange 486 having a cross section, as shown in FIG. 19. The first flange 482 is rigidly and fixedly attached to the vehicle exterior side surface of the inner pillar panel 30. The central section 484 extends away from the inner pillar panel 30 toward the outer pillar panel 32. The second flange 486 defines a second contact portion 488. The second contact portion 488 has the same relationship with the first contact portion 80 as the second contact portion 88 described above with respect to the first embodiment.

Fifth Embodiment

Figure 20:
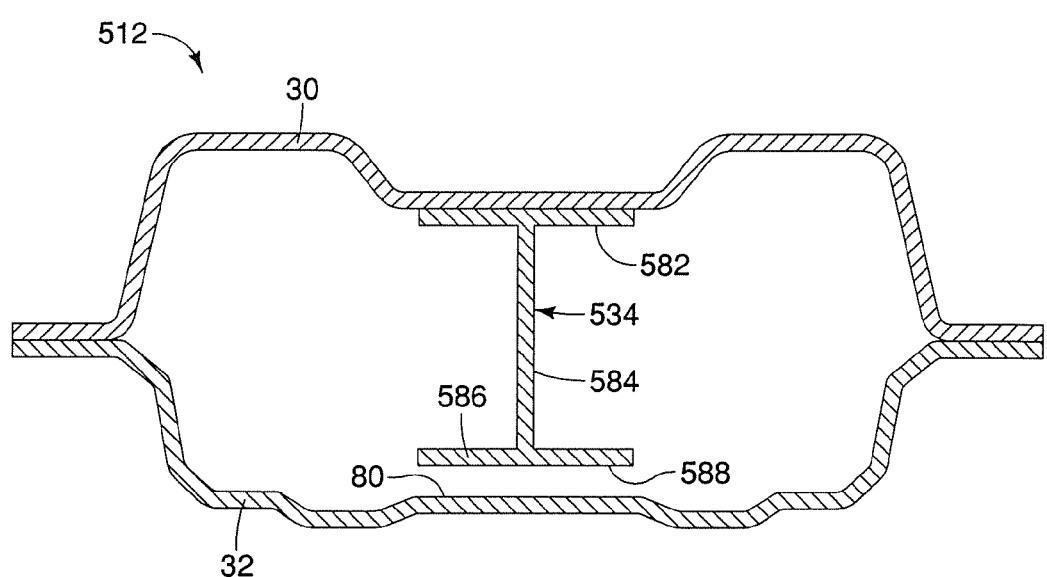
FIG. 20 is a cross-sectional view of a pillar assembly in accordance with a fifth embodiment.

Referring now to FIG. 20, a pillar assembly 512 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

The pillar assembly 512 of the fifth embodiment includes the inner pillar panel 30 and the outer pillar panel 32 as described above with respect to the pillar assembly 12 of the first embodiment. However, in the fifth embodiment, the reinforcement panel 36 is omitted and the brace 34 is replaced with a brace 534, as shown in FIG. 20. Preferably, the brace 534 has the same overall vertical length as the brace 34 of the first embodiment. However, the brace 534 has a differing profile, in particular, when viewed in cross-section, as in FIG. 19.

More specifically, the brace 534 includes a first flange 582, a central section 584 and a second flange 586 defining a transverse I-shaped cross section, as shown in FIG. 20. The first flange 582 is rigidly and fixedly attached to the vehicle exterior side surface of the inner pillar panel 30. The central section 584 extends away from the inner pillar panel 30 toward the outer pillar panel 32. The second flange 586 defines a second contact portion 588. The second contact portion 588 has the same relationship with the first contact portion 80 as the second contact portion 88 described above with respect to the first embodiment.

The various elements and components of the vehicle 10 not described above are conventional components that are well known in the art. Since these elements and components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure comprising:
an inner pillar panel including an upper end, a lower end, a vehicle interior side surface, a vehicle exterior side surface, and lateral edges;
an outer pillar panel including an upper end, a lower end, a vehicle interior side surface, a vehicle exterior side surface, and lateral edges, the lateral edges of the outer pillar panel coupled to the lateral edges of the inner pillar panel to define a vehicle pillar with a closed box cross section in a transverse direction of the vehicle pillar and a vertically extending cavity between the inner and outer pillar panels, the vehicle interior side surface of the outer pillar panel including a first contact portion facing the vehicle exterior side surface of the inner pillar panel; and
a brace rigidly fixed to the vehicle exterior side surface of the inner pillar panel, the brace including a second contact portion that faces the first contact portion of the outer pillar panel, the second contact portion of the brace being spaced apart from the first contact portion of the outer pillar panel by a predetermined gap with the inner and outer pillar panels in an undeformed state, the predetermined gap having a dimension such that the first contact portion of the outer pillar panel contacts the second contact portion of the brace in response to compression of the inner pillar panel such that while the inner pillar panel is in compression and the first contact portion of the outer pillar panel contacts the second contact portion of the brace, the outer pillar panel is in tension, the second contact portion having an upper end that is below and spaced apart from the upper end of the outer pillar panel.

2. The vehicle body structure according to claim 1, wherein the brace is positioned such that surface sections of the first contact portion contacting the second contact portion define a vertical friction area that produces resistance to movement of the outer pillar panel relative to the brace from the external force while the inner pillar panel is in compression.

3. The vehicle body structure according to claim 1, wherein the brace has an overall first length, the inner pillar panel has an overall second length greater than the first length, an upper terminating end of the brace being positioned at a first point on the inner pillar panel below and spaced apart from the upper end of the inner pillar panel, and a lower terminating end of the brace being positioned at a second point on the inner pillar panel below the first point, the second point being above and spaced apart from the lower end of the inner panel.

4. The vehicle body structure according to claim 1, wherein the outer pillar panel includes a reinforcement panel fixed to the vehicle interior side surface of the outer pillar panel, the reinforcement panel having a lower end terminating at a point above the lower end of the outer pillar panel and an upper end terminating at a point below the upper end of the outer pillar panel, the first contact portion being formed by a surface of the reinforcement panel that faces the brace.

5. The vehicle body structure according to claim 1, wherein the brace includes a first flange, a central section and a second flange defining a transverse hat-shaped cross section, the first flange and the second flange being fixed to the vehicle exterior side surface of the inner pillar panel, and the central section extending away from the inner pillar panel toward the outer pillar panel such that the inner pillar panel and the brace define a second closed box cross section in a transverse direction of the vehicle pillar within the vertically extending cavity.

6. The vehicle body structure according to claim 1, wherein the brace includes a first flange, a central section and a second flange defining a transverse Z-shaped cross section, the first flange being fixed to the vehicle exterior side surface of the inner pillar panel and the central section extending away from the inner pillar panel toward the outer pillar panel and the second flange defining the second contact portion.

7. The vehicle body structure according to claim 1, wherein the brace includes a first flange, a central section and a second flange defining a transverse C-shaped cross section, the first flange being fixed to the vehicle exterior side surface of the inner pillar panel and the central section extending away from the inner pillar panel toward the outer pillar panel and the second flange defining the second contact portion.

8. The vehicle body structure according to claim 1, wherein the brace includes a first flange, a central section and a second flange defining a transverse I-shaped cross section, the first flange being fixed to the vehicle exterior side surface of the inner pillar panel and the central section extending away from the inner pillar panel toward the outer pillar panel and the second flange defining the second contact portion.

9. The vehicle body structure according to claim 1, wherein the second contact portion is spaced apart from the first contact portion by a distance of about two millimeters.

10. The vehicle body structure according to claim 1, wherein
the first contact portion is spaced apart from the second contact portion by a distance that is between 1% to 6% of a depth of the vehicle pillar between the vehicle interior side surface of the inner pillar panel and the vehicle exterior side surface of the outer pillar panel along the first and second contact portions.

11. The vehicle body structure according to claim 1, wherein
the first and second contact portions are located substantially above respective mid-points of the outer and inner pillar panels.

12. The vehicle body structure according to claim 1, wherein
the inner pillar panel includes a maximum curved section with a radius of curvature such that a central point of the maximum curved section is located outboard of the upper end of the inner pillar panel, and
the brace extends along the inner pillar panel from a point above the maximum curved section to a point below the maximum curved section.

13. The vehicle body structure according to claim 12, wherein
the brace includes a first section and a second section, the first section extending upward from the central point of the maximum curved section and the second section extending downward from the central point of the maximum curved section, the second section having a greater vertical length than the first section.

14. The vehicle body structure according to claim 13, wherein
the first section of the brace and the second section of the brace are angularly offset from one another about the central point of the maximum curved section, such that the second contact portion of the brace also includes a curved section that extends approximately parallel to the maximum curved section of the inner pillar panel, and
the outer pillar panel includes a curved section that extends approximately parallel to the curved section of the inner pillar panel and the second contact portion of the brace in the undeformed state.

15. The vehicle body structure according to claim 1, further comprising
a roof side rail rigidly fixed to the upper ends of the inner pillar panel and the outer pillar panel, the roof side rail extending in a direction transverse to the vehicle pillar; and
a sill extending in a direction transverse to the vehicle pillar with the lower end of the inner pillar panel being fixedly attached to the sill, and the lower end of the outer pillar panel being fixedly attached to the sill.

16. The vehicle body structure according to claim 1, wherein
the inner pillar panel and the brace have a rigidity that is higher than the outer pillar panel.

17. The vehicle body structure according to claim 1, wherein
the brace is free from contact with the outer pillar panel with the inner pillar panel in the undeformed state.

18. A vehicle body structure comprising:
an inner pillar panel including an upper end, a lower end, a vehicle interior side surface, a vehicle exterior side surface, and lateral edges, the inner pillar panel having a maximum curved section proximate a mid-section of the inner pillar panel having a radius of curvature such that a central point of the maximum curved section is located outboard of the upper end of the inner pillar panel;
an outer pillar panel including an upper end, a lower end, a vehicle interior side surface, a vehicle exterior side surface, and lateral edges, the lateral edges of the outer pillar panel coupled to the lateral edges of the inner pillar panel to define a vehicle pillar with a closed box cross section in a transverse direction of the vehicle pillar and a vertically extending cavity between the inner and outer pillar panels, the vehicle interior side surface of the outer pillar panel including a first contact portion facing the vehicle exterior side surface of the inner pillar panel;
a roof side rail rigidly fixed to the upper ends of the inner pillar panel and the outer pillar panel, the roof side rail extending in a direction transverse to the vehicle pillar; and
a brace rigidly fixed to the vehicle exterior side surface of the inner pillar panel, the brace including a second contact portion that faces the first contact portion of the outer pillar panel, the second contact portion of the brace being spaced apart from the first contact portion of the outer pillar panel by a predetermined gap with the inner and outer pillar panels in an undeformed state, the predetermined gap having a dimension such that the first contact portion of the outer pillar panel contacts the second contact portion of the brace in response to compression of the inner pillar panel, the brace extending along the inner pillar panel from a point above the maximum curved section to a point below the maximum curved section, the second contact portion having an upper end that is below and spaced apart from the upper end of the outer pillar panel.

19. The vehicle body structure according to claim 18, wherein
while the inner pillar panel is in compression and the first contact portion of the outer pillar panel contacts the second contact portion of the brace, the outer pillar panel is in tension.

20. The vehicle body structure according to claim 18, wherein
the brace is free from contact with the outer pillar panel with the inner pillar panel in the undeformed state.

* * * * *